United States Patent [19]
Katoh et al.

[11] Patent Number: 5,734,943
[45] Date of Patent: Mar. 31, 1998

[54] DEVICE HAVING CARTRIDGE CHAMBER WITH POSITIONED COVER

[75] Inventors: Minoru Katoh, Kawasaki; Kiyosada Machida, Urawa; Junichi Omi, Kawasaki, all of Japan

[73] Assignee: Nikon Corporation, Tokyo, Japan

[21] Appl. No.: 622,302

[22] Filed: Mar. 25, 1996

[30] Foreign Application Priority Data

Jun. 16, 1995 [JP] Japan ................................. 7-150399

[51] Int. Cl.$^6$ .................................................. G03B 17/02
[52] U.S. Cl. ............................................................ 396/538
[58] Field of Search ................................... 354/288, 174; 396/439, 535, 538

[56] References Cited

U.S. PATENT DOCUMENTS

| | | | |
|---|---|---|---|
| 5,146,255 | 9/1992 | Nakai et al. | 396/6 |
| 5,258,793 | 11/1993 | Tsuji et al. | 354/288 |
| 5,481,325 | 1/1996 | Wada et al. | 354/288 X |

Primary Examiner—David M. Gray
Assistant Examiner—J. K. Han
Attorney, Agent, or Firm—Oliff & Berridge, P.L.C.

[57] ABSTRACT

To avoid making a device body larger through positioning of a rotation shaft of a cartridge cover, a device having a device body containing a cartridge chamber into which a film cartridge can be inserted and removed in a axial direction, a cartridge cover provided on the device body which opens and closes the cartridge chamber by rotating about a predetermined axis of rotation, and a device-composing component positioned to the side of the cartridge chamber to extend in a first direction orthogonal to the direction of insertion and removal of the cartridge, the axis of rotation of the cartridge cover extends in a second direction inclined to the first direction from a position near device-composing component. The positioning of the axis of rotation of the cartridge cover in the camera body and not along an edge or corner also improves the camera's aesthetic and ergonomic qualities.

17 Claims, 3 Drawing Sheets

1

DEVICE HAVING CARTRIDGE CHAMBER WITH POSITIONED COVER

BACKGROUND OF THE INVENTION

1. Field of the Invention

The invention relates to a device, such as a camera, in which a film cartridge can be loaded, in particular to a device which aims for compactness.

2. Background of Related Art

FIGS. 5 and 6 show the structure of one type of conventional camera. In the camera body 1, a photographic lens barrel 5 is provided in the center, and a cartridge chamber 7 and a spool chamber 6 are provided on the two sides thereof. A cartridge (not shown) can be inserted into and removed from the cartridge chamber 7 in an axial direction from the bottom surface of the camera. On the bottom surface of the camera body 1, a cartridge cover 108 is provided which opens and closes the cartridge chamber 7. A hinge shaft 108b, of a hinge unit 108a of the cartridge cover 108 is supported in the camera body 1 so as to be capable of rotation. A film supply mechanism 4a is provided on the bottom of the spool chamber 6, and the drive power therefrom is transferred to the top of the camera via a rod 11. The drive power is also transferred to the film supply mechanism 4b, above the cartridge chamber, via a transfer mechanism (not shown). Through supply mechanisms 4a, 4b, the film FI is extracted from the film cartridge in the cartridge chamber 7 and fed to the spool chamber 6. A lens driving motor 9 extends in the direction of the optical axis L of the lens barrel 5 and is positioned between the lens barrel 5 and the cartridge chamber 7. The lens driving motor 9 is near the bottom surface of the camera body 1 so as to avoid interference with the supplied film FI. An electronic flash device 2, and automatic focus (AF) unit 3 are also found in the camera body 1.

The hinge unit 108a, of the cartridge cover 108 is positioned between the cartridge chamber 7 and the lens driving motor 9 in the bottom surface of the camera body 1. In the conventional camera, because the hinge unit 108a extends in a direction parallel with the optical axis of the photographic lens barrel 5, the motor 9 interferes with the hinge unit 108a when the motor 9, also positioned near the camera bottom, is very close to the cartridge chamber 7. Accordingly, it is necessary to have a certain amount of space between the lens driving motor 9 and the cartridge chamber 7, creating the problem that the camera body 1 becomes that much larger.

If the hinge unit 108a is provided in the corner formed by the side surface and the bottom surface of the camera body 1, it is possible to position the driving motor 9 nearer to the cartridge chamber 7, but in this case the thickness between the side wall of the cartridge chamber 7 and the side surface of the camera body 1 must be increased to provide space to support the hinge unit 108a which causes the camera body 1 to also become larger as discussed above. This has a further negative effect on the camera design as it becomes impossible to provide a unitary or continuous surface in the corner. The same problem arises when the hinge unit 108a is provided in the corner between the bottom surface and the front surface or the back surface of the camera body 1.

SUMMARY OF THE INVENTION

It is an object of the invention to provide a device in which a cartridge can be loaded wherein the device body does not become larger through changing the position of the axis of rotation of the cartridge cover and in which no negative effects in loading or use are incurred.

The invention can be applied to a device comprising a device body which has a cartridge chamber in which a film cartridge can be inserted and removed in the axial direction; a cartridge cover which is provided on the device body, the cartridge cover opening and closing an opening of the cartridge chamber by rotating about a predetermined axis of rotation; and a device-composing component which is positioned to the side of the cartridge chamber so as to extend in a first direction which is orthogonal to the direction of insertion and removal of the film cartridge.

The axis of rotation of the cartridge cover extends in a second direction which is inclined with respect to the first direction from a position near the surface of the device-composing component on the cartridge chamber side in order to resolve the above-described problems in the conventional camera.

Further, the cartridge chamber has a first region which houses the film housing portion of the film cartridge and a second region which houses the film feeding portion, which is integral with the film housing portion. The axis of rotation of the cartridge cover is positioned near a step unit formed on the boundary between the first region and the second region. The axis of rotation of the cartridge cover is surrounded by the device-composing component and the first portion and the second portion of the cartridge chamber.

The device further comprises a photographic lens for exposing the film which is extracted from the film cartridge and the first direction is the direction of an optical axis L of the photographic lens. The device-composing component is a motor for driving the photographic lens.

The rotation shaft of the cartridge cover extends from a position near the surface of the device-composing component on the side toward the cartridge chamber in a direction which is inclined with respect to the direction along which the device-composing component extends. Accordingly, the cartridge cover can be opened and closed without positioning the rotation shaft between the cartridge chamber and the region of the device-composing component which is closest to the cartridge chamber side. Thus, the device-composing component can be positioned as close as possible to the cartridge chamber.

BRIEF DESCRIPTION OF THE DRAWINGS

The invention will be described with reference to the drawings in which.

DETAILED DESCRIPTION OF PREFERRED EMBODIMENTS

The preferred embodiment, when the invention is applied to a camera, will be described with reference to FIGS. 1–4.

Figure 5:
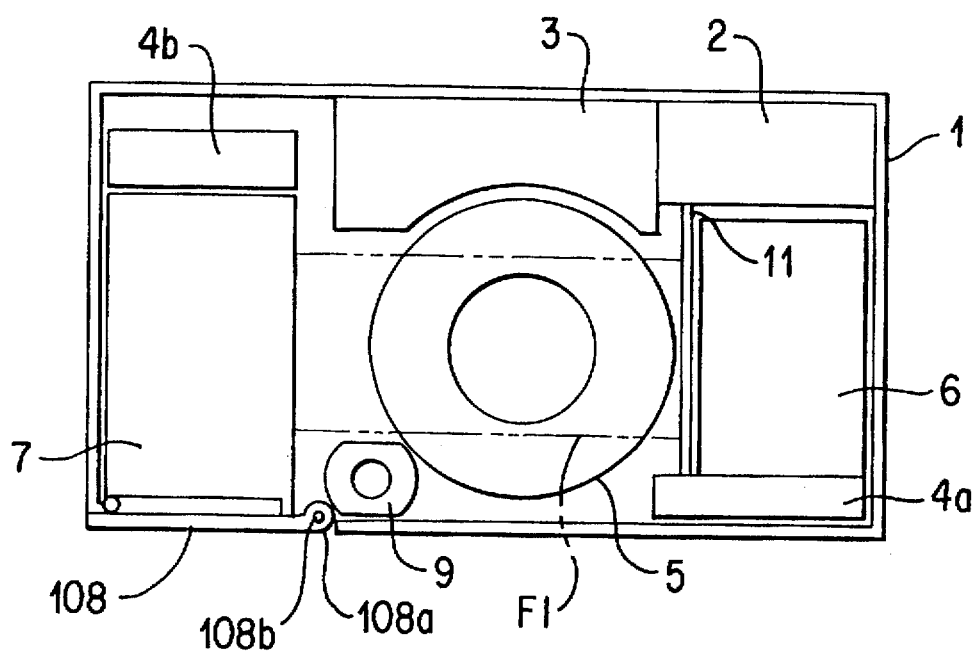
FIG. 5 is a front cut-away view of one type of conventional camera.
Figure 6:
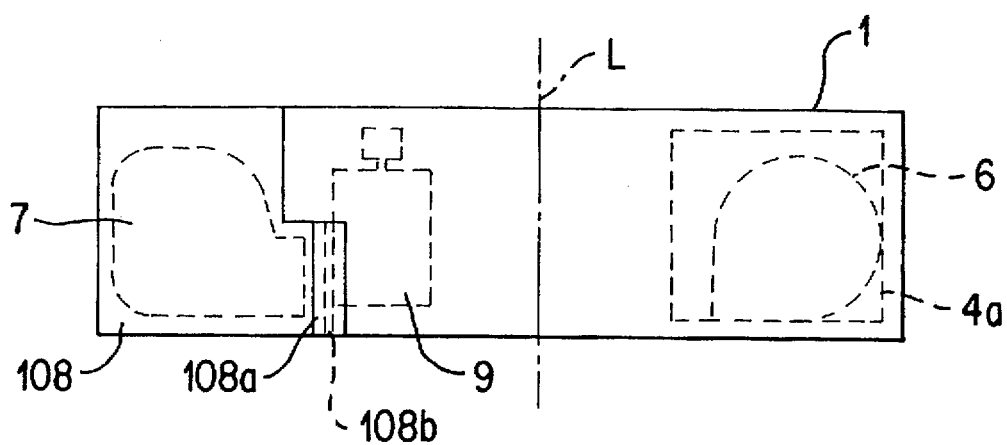
FIG. 6 is a view of the bottom of the conventional camera of FIG. 5.

FIGS. 1–4 show the structure of a camera according to the embodiment. Elements having the same structure or functionality as used with FIGS. 5 and 6 will be labeled with the same reference numbers.

Figure 1:
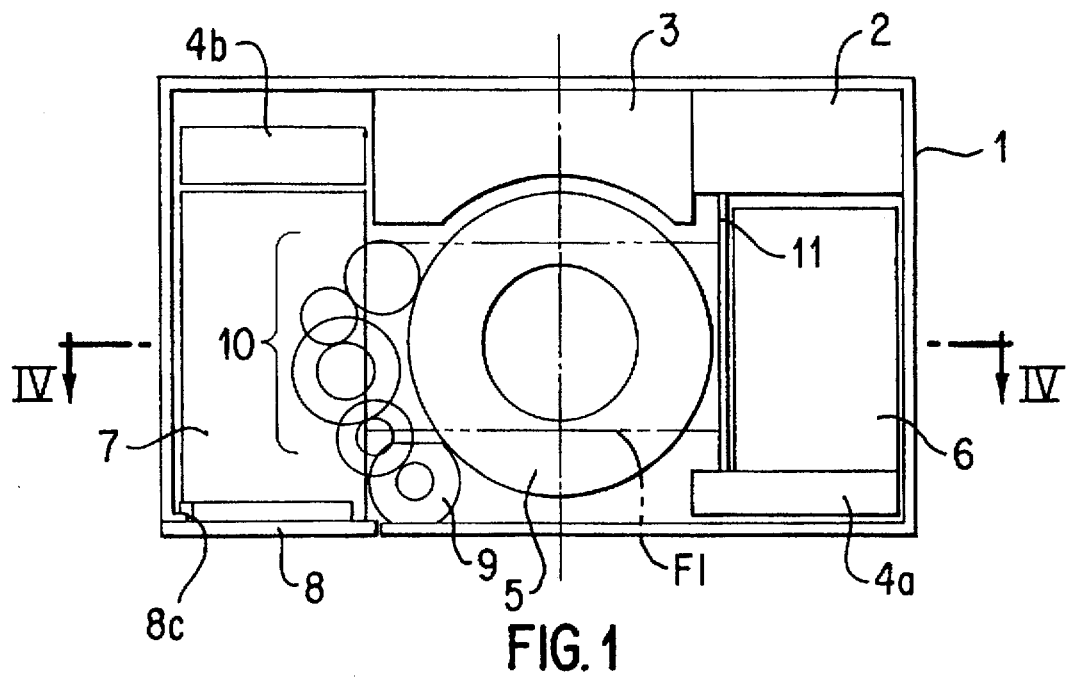
FIG. 1 is a front cut-away view of a camera according to an embodiment of the invention.

In FIG. 1, a lens barrel gear train 10 is used to transfer the drive power of the lens driving motor 9 to the lens barrel 5. Through this gear train 10, the photographic lens in the lens barrel 5 is moved along the optical axis. A cartridge chamber 7 is provided on one side of the camera body 1. The cartridge chamber has a first region 7a comprising a film housing portion for a film cartridge (not shown), and a second region 7b comprising a film feeding portion that is formed integrally with the film housing portion. The second region 7b protrudes toward the motor 9. The film FI which is extracted from the film cartridge is guided to the spool chamber 6 through a film passage (FP) on the rear side of the camera (FIG. 4, directions are in terms of the lens side being the front and the camera held in a normal use position) and is wound around a winding spool (not shown) in a spool chamber 6.

Figure 2:
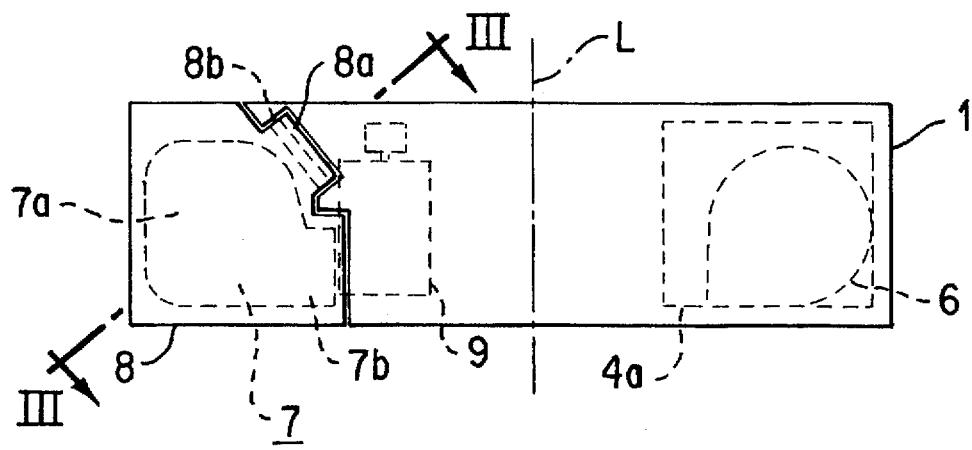
FIG. 2 is a view of the bottom surface of the camera.

A cartridge cover 8 is provided on the bottom surface of the camera body 1 and has an irregular shape, such as shown in FIG. 2. A hinge unit 8a is provided on a projecting portion formed near the back surface of the camera. The hinge unit 8a is positioned near the boundary between the first region 7a and the second region 7b of the cartridge chamber 7. Specifically, the hinge unit 8a is in a location surrounded by the first region 7a, the second region 7b, the lens driving motor 9, and the front of the camera.

Figure 3:
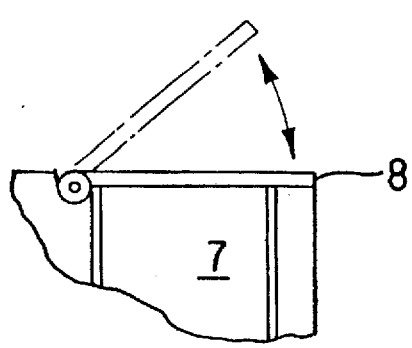
FIG. 3 is a cross-sectional view taken along line III—III in FIG. 2.
Figure 4:
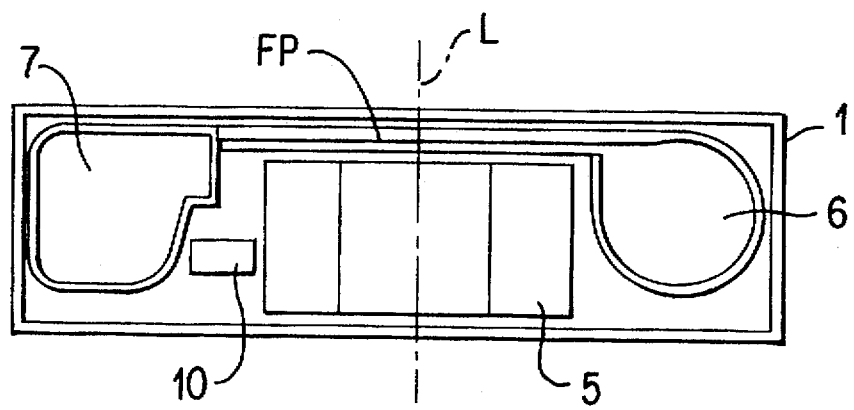
FIG. 4 is a cross-sectional view taken along line IV—IV in FIG. 1.

The hinge unit 8a extends from a position near the motor 9 toward the front of the camera in a direction, or at an angle, which is inclined with respect to the optical axis L of the lens barrel 5. The hinge shaft 8b of the hinge unit 8a (and which extends in the same direction as the hinge unit 8a) is held at both ends in the bottom surface of the camera body 1 so as to be capable of rotation. Rotation of the cartridge cover 8 on the hinge shaft 8b opens and closes a opening into the cartridge chamber 7 as shown in FIG. 3. An engagement stop unit 8c (FIG. 1) is engaged by the camera body 1 so that the cartridge cover 8 is retained in a closed state. The engagement between the engagement stop unit 8c and the camera body 1 is determined by the use of a retention or latching mechanism as would be known to one skilled in the art.

With the embodiment, the hinge unit 8a of the cartridge cover 8 is not between the second region 7b of the cartridge chamber 7 and the motor 9. Consequently, it is possible to position the cartridge chamber 7 as close as possible to the motor 9 thereby reducing the width of the camera in comparison with conventional cameras. In particular, the location surrounded by the first region 7a, second region 7b, the motor 9 and the front of the camera is dead space in conventional cameras. By positioning the hinge unit 8a in that space, the interior space of the camera can be more effectively utilized without an adverse influence exerted on the positioning of the other elements that comprise the camera.

In addition, because the hinge unit 8a extends at an inclination, or angle with respect to the optical axis L, it is possible to increase the length of the hinge unit 8a to a maximum. As a result, no problems are incurred with regard to strength. Furthermore, because the hinge 8a is not positioned in a corner of the camera body 1, there are no undesirable influences on the appearance or handling of the camera body 1.

In the above-described embodiment, the camera body 1 comprises the device body, the hinge shaft 8b comprises the axis of rotation, and the lens driving motor 9 comprises the device-composing component. In addition, the direction of the optical axis of the photographic lens barrel 5 corresponds to the first direction.

The above explanation describes an example wherein the cartridge cover is provided on the bottom surface of the camera body, but it is also possible for the cover to be provided on the top surface. In addition, the hinge shaft, which is supported by the hinge unit of the cartridge cover, was attached to the camera body so as to be capable of rotating, but it would also be possible for the hinge shaft to be formed integrally in the camera body side so as to rotatably support the hinge unit provided on the cartridge cover. Furthermore, the device-composing component is not restricted to the lens driving motor, but may also be another motor, or the condenser for an electronic flash device or other component. In addition, the above explanation used an example involving a camera, but the invention can also be applied to a device other than a camera so long as it has a cartridge chamber into which a cartridge is loaded in an axial direction, and a cartridge cover which opens and closes the cartridge chamber in a rotational manner. An example of such a device is one which projects the images on a film onto a screen.

With the invention, the rotation shaft of the cartridge cover extends from a position near the device-composing component in a direction inclined with respect to the direction along which the device-composing component extends. Consequently, the cartridge cover can be opened and closed without positioning the rotation shaft between the device-composing component and the region of the cartridge chamber which is closest to the device-composing component. Accordingly, the cartridge chamber can be positioned as close as possible to the device-composing component, thereby enhancing compactness of the camera, while the aesthetic and ergonomic factors of the camera are not impaired because the rotation shaft is not positioned in a corner of the device body.

The invention has been described using an embodiment thereof to ease understanding, but the description is intended to be illustrative and not limiting.

What is claimed is:

1. A device in which a film cartridge can be loaded, comprising:

a device body, a cartridge chamber in the device body into which the film cartridge can be inserted and removed in an axial direction;

a cartridge cover provided on the device body, the cartridge cover opening and closing an end of the cartridge chamber by rotating about a predetermined axis of rotation; and a device-composing component positioned adjacent to one side of the cartridge chamber and extending in a first direction orthogonal to the axial direction, wherein the axis of rotation of the cartridge cover extends in a second direction forming an oblique angle with respect to the first direction from a position adjacent the device-composing component.

2. The device according to claim 1, wherein the cartridge chamber comprises:

a first region which holds the film cartridge; and a second region which defines a film feeding portion and is integral with the first region, wherein the axis of rotation of the cartridge cover is positioned near a step formed at a boundary between the first region and the second region.

3. The device according to claim 2, wherein the axis of rotation of the cartridge cover is positioned adjacent to the device-composing component.

4. The device of claim 1, further comprising a photographic lens for exposing film which is extracted from the film cartridge, wherein the first direction is also a direction of an optical axis of the photographic lens.

5. The device according to claim 4, wherein the device-composing component is a motor for driving the photographic lens in the direction of the optical axis.

6. A device having a cartridge loaded therein during use, comprising:
- a device body having at least a first side and an opposite second side spaced from the first side;
- a cartridge chamber in the device body extending from the first side toward the second side, the cartridge chamber having an open end in the first side and having a longitudinal axis extending in a first direction;
- an operating component of the device having a longitudinal axis extending in a second direction perpendicular to the first direction, the operating component being adjacent to the cartridge chamber; and
- a cartridge chamber cover rotatably mounted in the first side of the device body, an axis of rotation of the cartridge chamber cover extending in an axial direction, the axial direction being at an oblique angle to the second direction.

7. The device of claim 6, wherein the cartridge chamber has a first region for receiving a cartridge and a second region integral with and extending from the first region for feeding a material from the cartridge.

8. The device of claim 7, wherein the first region is substantially cylindrical.

9. The device of claim 8, further comprising a step region defined by a junction of the first region and the second region.

10. The device of claim 9, wherein the device is a camera, further comprising a lens system having a longitudinal axis parallel to a longitudinal axis of the operating component.

11. The device of claim 10, wherein the operating component is a motor for driving the lens system.

12. A device having a cartridge loaded therein during use, comprising:
- a device body having at least a first side and an opposite second side spaced from the first side;
- container means for receiving and holding the cartridge, the container means open at one end;
- operating means having a longitudinal axis extending in a first direction for causing the operation of at least one component of the device; and
- cover means rotatably mounted in the first side of the device body for closing and opening the open end of the container means, wherein a rotatable mounting means of the cover means extending in a second direction forming an oblique angle to the first direction.

13. The device of claim 12, wherein the container means comprises:
- a container chamber receiving the container; and
- feeding control means for defining a feeding path for a material held in the container, the container chamber and feeding control means being integral to one another.

14. The device of claim 13, wherein the feeding control means extends from the container chamber, a junction therebetween defining a step portion.

15. The device of claim 14, wherein the device is a camera and further comprising a lens system having a longitudinal axis parallel to the longitudinal axis of the operating means.

16. The device of claim 15, wherein the operating means is a motor for driving the lens system.

17. The device of claim 13, wherein the container chamber is substantially cylindrical.

* * * * *